Figure 1:
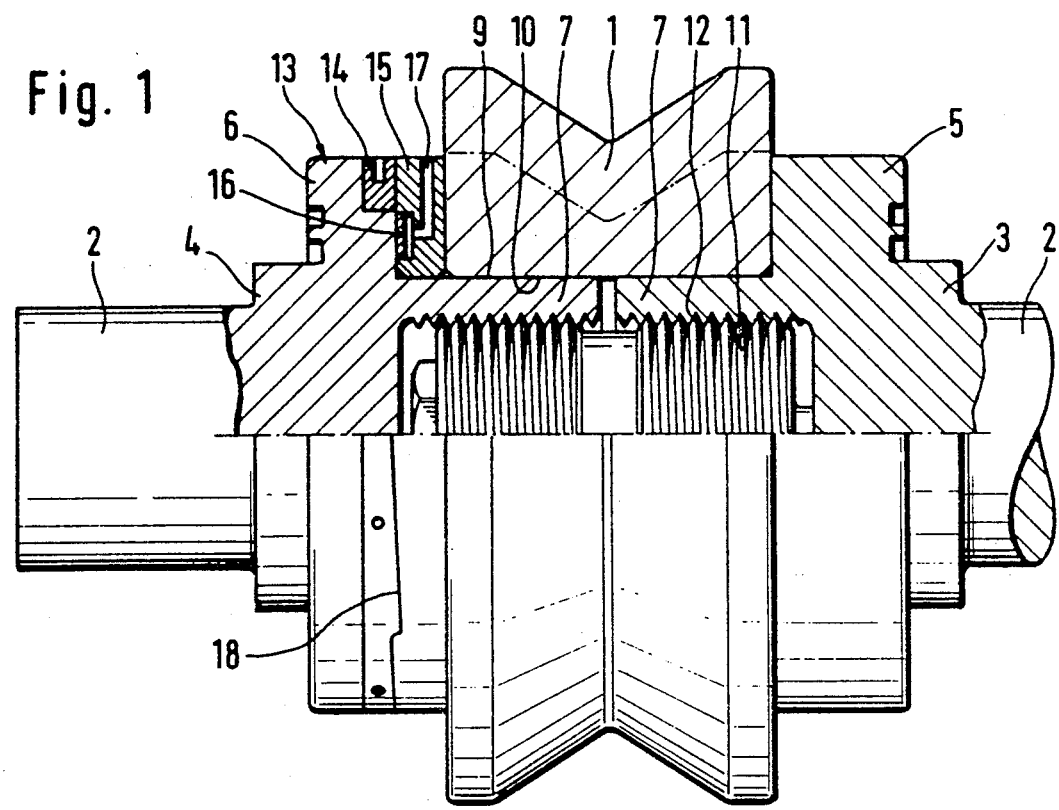

United States Patent [19]
Kark

[11] Patent Number: 5,109,585
[45] Date of Patent: May 5, 1992

[54] ROLL FOR A ROLL STAND HAVING AN EXCHANGEABLE ROLL RING AND A DIVIDED ROLL BODY

[76] Inventor: Uwe Kark, Cuxhavener Strasse 60a, 2104 Hamburg 92, Fed. Rep. of Germany

[21] Appl. No.: 674,777

[22] Filed: Mar. 25, 1991

[30] Foreign Application Priority Data

Oct. 24, 1990 [DE] Fed. Rep. of Germany ....... 9014728

[51] Int. Cl.$^5$ .................... B21B 27/02; B21B 31/08; B60B 7/04
[52] U.S. Cl. ...................................... 29/123; 29/125; 72/252.5
[58] Field of Search ............. 72/199, 200, 237, 252.5; 29/116.1, 123, 125, 130

[56] References Cited

U.S. PATENT DOCUMENTS

| | | |
|---|---|---|
| Re. 31,554 | 4/1984 | Giege et al. . |
| 3,461,527 | 8/1969 | Strandell ................................ 29/123 |
| 4,105,264 | 8/1978 | Zimmermann et al. ........... 29/121.6 |
| 4,117,705 | 10/1978 | Dempsey ................................ 29/125 |
| 4,274,185 | 6/1981 | Mifune et al. ......................... 29/125 |
| 4,817,410 | 4/1989 | Yatsuzuka et al. ................... 72/199 |
| 4,841,612 | 6/1989 | Kark ..................................... 29/123 |
| 4,932,111 | 6/1990 | Kark . |
| 4,961,261 | 10/1990 | Kojima et al. ........................ 29/125 |

FOREIGN PATENT DOCUMENTS

| | | |
|---|---|---|
| 0040808A1 | 12/1981 | European Pat. Off. . |
| 0292358A1 | 11/1988 | European Pat. Off. . |
| 0343440A1 | 11/1989 | European Pat. Off. . |
| 1811614 | 6/1970 | Fed. Rep. of Germany . |
| WO88/09444 | 12/1988 | World Int. Prop. O. . |

OTHER PUBLICATIONS

International Search Report for PCT/EP91/00440.

Primary Examiner—Lowell A. Larson
Assistant Examiner—Thomas C. Schoeffler
Attorney, Agent, or Firm—Chilton, Alix & Van Kirk

[57] ABSTRACT

Roll for a roll stand having an exchangeable roll ring and a divided roll body, the two parts of which each form a tensioning flange and are interconnected by a central tensile connection. An axial tensioning device is provided which comprises a threaded device for transmitting the forces acting between the two parts of the roll body and for their basic setting, a hydraulic tensioning device for tensioning the arrangement and a mechanical fixing device for fixing the hydraulically produced state of tension. According to the invention, the central tensile connection is limited to a central section of the length of the roll and it comprises the threaded device. The hydraulic tensioning device and the mechanical fixing device are arranged on the external circumference of the roll. At least one of the two parts of the roll body preferably forms a radial seat which interacts with the bore hole of the roll ring including a clearance for assembly and which can be spread apart by means of a wedge device provided in the tensile connection under the force transmitted by the tensile connection for removing the clearance for assembly. The wedge device can be formed by the inclined flanks of a thread inside the radial seat (radial seats).

7 Claims, 1 Drawing Sheet

ROLL FOR A ROLL STAND HAVING AN EXCHANGEABLE ROLL RING AND A DIVIDED ROLL BODY

The invention relates to a roll for a roll stand having an exchangeable roll ring and a divided roll body, the two parts of which each form a tensioning flange for the roll ring and are interconnected by a central tensile connection, and having an axial tensioning device which comprises a threaded device for transmitting the forces acting between the two parts of the roll body and for their basic setting, a hydraulic tensioning device for tensioning the arrangement and a mechanical fixing device for fixing the hydraulically produced state of tension.

It is known (U.S. Pat. No. 4,117,705, U.S. Pat. No. No. 31,554) to tension one or more roll rings on a roll body by means of an axial tensioning device which comprises three elements, namely firstly a nut, with the aid of which the roll ring and the arrangement provided for its axial tensioning can be brought into a basic setting, from which the state of tension is developed, and which transmits the force produced for tensioning the roll ring onto the roll body; secondly a hydraulic tensioning device for tensioning the arrangement; and thirdly a mechanical fixing device, by means of which the hydraulically produced state of tension is fixed before the hydraulic tensioning device is released. This arrangement requires a substantial axial space which is not available on short rolls intended for modern compact roll stands. In order that the principle of axial roll ring tensioning may nevertheless be used even in compact roll stands, the construction mentioned at the beginning has been proposed which has a divided roll body. Each of the two parts of the roll body forms an integrally connected tensioning flange for the axial tensioning of the roll ring. This tensioning is effected by means of a tension rod provided in the centre of the roll, which tension rod is guided out of the one part of the roll body through a bore hole in said part so that the axial tensioning device mentioned can be accommodated at the end of the roll on the other side of the one bearing of said roll (prior public use). It has been shown, however, that the roll ring in this construction is not held sufficiently rigidly in some cases, which may be due to a construction-related nonrigidity of the roll body.

The underlying object of the invention is to provide a roll which is suitable for a compact roll stand and does not have these disadvantages. Setting out from the roll mentioned at the beginning, the object is achieved in that the central tensile connection, which is limited to a central section of the length of the roll, comprises the threaded device and in that the hydraulic tensioning device and the mechanical fixing device are arranged on the external circumference of the roll.

This solution is based on three essential conceptual elements. The first consists in the knowledge that the space requirement of the axial tensioning device is caused primarily by the nut, whereas the hydraulic tensioning device and the mechanical fixing device can be designed to have a small axial space requirement on the circumference of the roll next to the roll ring if the construction principle as disclosed, for example, in EP-A 0,343,440 is used. The second element consists in the concept that it is not necessary to interpret the axial tensioning device as a constructional unit and that therefore the nut can also be accommodated at a different place. The third conceptual element consists in the fact that the nut or a threaded device replacing said nut can be designed as part of the tensile connection which has to be provided in any case in order to interconnect the two parts of the roll body. Finally, the last element of the concept of the invention consists in the fact that, by virtue of the invention, the tensile connection can be restricted to the central region of the roll body and that it therefore does not have to be guided axially out of the roll in the form of a tension rod, thereby considerably reducing the longitudinal expansion, associated with the loading of the roll, of the parts of the roll body under tensile stress. The long, comparatively thin tension rod guided axially out of the roll body in the known construction indeed acts like a tension spring which makes the overall construction nonrigid. Since, by its very nature, there must also be clearance between the tension rod of the known construction and the sleeve surrounding it, these parts can also move relative to each other, which leads to a mutual "working" of the elements of the roll body under the high operating load and thus to an insufficient fixing of the roll ring. In contrast, if the tensile connection is limited according to the invention to that longitudinal extension which is required for the connection function, on the one hand an element is avoided which is thin, long and therefore easily expandable in the longitudinal direction and, additionally, the constructional freedom is gained to design the tensile connection in such a simple and compact manner that mutual clearance of the individual elements is virtually or completely ruled out. The construction is also simplified because the threaded device, which serves for replacing the nut of the axial tensioning device, is used at the same time for the tensile connection of the parts of the roll body.

As is known per se, it is expedient not only to tension the roll ring axially, but also to give it a radial support. For this purpose, in the known construction radial seat surfaces are provided on the two parts of the roll body adjacent to the axial tensioning flanges, which radial seat surfaces interact with the bore hole of the roll ring. In order to be able to support it securely, the radial seat must interact without clearance with the bore hole of the roll ring. This can only be realised by a press fit which, on the one hand, can lead to surface damage on the interacting surfaces during assembly and, on the other hand, can only be of short axial construction, with the result that the highly stressed central region of the roll ring remains unsupported radially. According to an important feature of the invention, this disadvantage can be eliminated by the fact that a radial seat for the bore hole of the roll ring, which is formed by at least one of the two parts of the body, can be spread apart by means of a wedge device provided in the tensile connection under the force transmitted by the tensile connection for removing the clearance for assembly. It is indeed known to provide additionally a radial support based on the wedge effect in devices acting primarily axially for tensioning roll rings. However, it is novel to use the knowledge that the force transmitted in the tensile connection of the two parts of the roll body can be applied directly for spreading the radial seat apart.

This spreading can be implemented by means of conical devices which, however, harbour the basic disadvantage that cones under axial tensile stress have to absorb the highest tensile stress at that end at which they have the smallest cross section. This is especially undesirable in the context of the invention in which the largest possible cross sections are important in view of the rigidity of the construction. The invention avoids this disadvantage by the fact that it uses the inclined flanks of a thread as the wedge arrangement; a thread of this type can easily be accommodated inside the radial seat or the radial seats, the cross sections and diameters and flank angles of the thread being dimensioned such that at least the clearance for assembly between the radial seat surfaces and the bore hole of the roll ring is compensated under the tensile force prevailing between the two parts of the roll body. Moreover, if desired, a certain radial prestress of the roll ring can also be produced.

The presence of a clearance for assembly allows the radial seat or the radial seats to be expanded axially to any desired extent so that a proportion of any desired size of the bore hole of the roll ring can thereby be supported. Expediently, the roll ring is supported on the greater part of its length, more expediently on more than three quarters of its length.

The radial support of the roll ring and the rigidity of the construction are enhanced by the fact that the approximately hollow-cylindrical parts, which form the radial seat or the radial seats, can be supported on their entire length by a threaded bolt penetrating said parts. This support is effective despite the thread containing the originally necessary clearance for assembly because it transmits the high axial force and the thread flanks of the interacting parts are therefore held together rigidly and without clearance. Although the roll body inside the roll ring is composed of several parts, it therefore behaves rigidly like an integral body.

Figure 2:
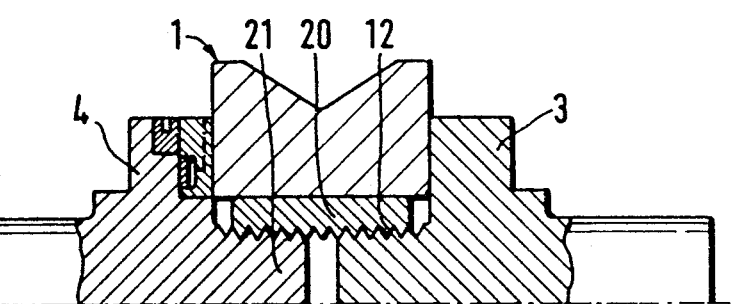
Figure 3:
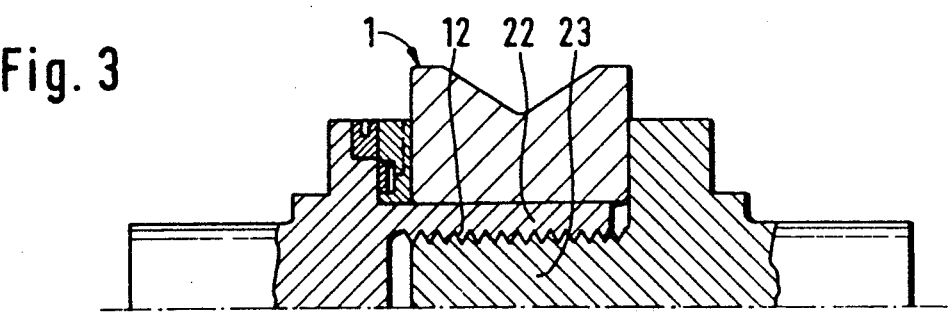

The invention is described in greater detail below with reference to the drawing which diagrammatically illustrates exemplary embodiments of the invention. In said drawing, FIGS. 1 to 3 show different exemplary embodiments in longitudinal section.

The roll consists of the roll ring 1 and the roll body which holds the bearing body, forms two bearing pins 2 and consists of the parts 3 and 4 which are of approximately symmetrical construction. Each of said parts has a flange 5 and 6 respectively which interact in each case with an end face of the roll ring 1 in order to tension it axially. Inside the roll ring 1, the parts 3, 4 of the roll body extend hollow-cylindrical continuations 7 towards each other, which continuations are designated below as radial seats because their external circumference 9 forms a radially supporting seat surface seat the bore hole 10 [sic] of the roll ring 1. The diameter of the circumference 9 is slightly smaller than the diameter of the bore hole 10 in the unstressed state. The difference is in the order of magnitude of some hundredths to some tenths of a millimetre. Inside the radial seats 7 there is a pin 11, the radial seats 7 and the pin 11 being fitted with an interacting thread 12, preferably a trapezoidal thread. The removal of the clearance for assembly in the roll ring ensures that the two parts of the roll body are centred in precise alignment.

Whereas the flange 5 is of solid construction, the flange 6 is composed of a part 13, which is integral with the core of the part 3 of the roll body, a fixing ring 14 and a contact ring 15. The contact ring 15 contains an annular piston cylinder device 16 which can be fed with a hydraulic pressure medium via a channel 17. The fixing ring 14 and the contact ring 15 have complementary sloping surfaces 18, extending in the circumferential direction in the surface in which they interact. Reference can be made to EP-A 0,343,440, already mentioned, for details of this arrangement.

During assembly, firstly the threaded pin 11 is screwed into the threaded bore hole of the part 3 of the roll body. The roll ring 1 is placed on the seat 7 of this part of the roll body. The part 4 of the roll body is inserted with its radial seat 7 into the roll ring 1 and, at the same time, screwed onto the pin 11. Whereas the fixing ring 14 and the contact ring 15 are in their starting position which is defined by the smallest common length, the two parts 5, 6 of the roll body are screwed together to the extent that the roll ring 1 is clamped fixedly between them. Then pressure is applied to the hydraulic tensioning device 16 in order to tension the arrangement. The tensioning forces, which are transmitted from the contact ring 15 via the roll ring 1, flange 5, radial seat 7 of the part 5 of the roll body, pin 11, radial seat 7 of the part 4 of the roll body, flange 6 back to the piston 16 of the contact ring 15, lead to an expansion of these parts and thus to the formation of a gap between the contact ring 15 and the fixing ring 14. When the desired state of tension is achieved, the latter is secured by the fixing ring 14 being rotated until the flanks 18 come to rest. Then the hydraulic tensioning device is released, the state of tension, however, being maintained by virtue of the fixing ring 14.

The flank angle of the thread 12, the thickness of the radial seat parts 7 and the clearance between the surfaces 9 and 10 are dimensioned such that the radial seats 7 are expanded in the radial direction under the stress acting in the thread 12 and the wedge effect at the thread turns to the extent that the clearance for assembly between the surfaces 9 and 10 disappears and, if appropriate, a certain radial prestress is exerted on the roll ring 1.

It can be recognised that this arrangement leads to a frictionless bonding not only between the roll ring 1 and the flanges 5, 6, but also between the bore hole 10 of the roll ring 1, the external surface 9 of the radial seats 7 and between the interacting thread flanks of the radial seats 7 and of the pin 11. These parts can easily be dimensioned such that relative movements between them are ruled out under the prevailing stresses. The roll therefore behaves like an integral, rigid body.

The embodiment according to FIG. 2 differs from that according to FIG. 1 in that the third member 20 connecting the two parts 3, 4 of the roll body is constructed as a sleeve whereas the parts of the roll body have corresponding pins 21 which interact with the sleeve 20 via a thread 12. The sleeve 20 and the flank angle of the thread 12 and the clearance for assembly between the external surface of the sleeve 20 and the bore hole of the roll ring 1 are likewise dimensioned as in the abovementioned example such that the clearance for assembly disappears in the stressed state of the arrangement. As an alternative, provision can be made for the sleeve 20 to have the same diameter as the bore hole of the roll ring at ambient or operating temperature or even to have a certain overdimensioning and for a temperature difference between these two parts to be used for assembly. The spreading effect in the case of the sleeve 20 can then be dispensed with or be of correspondingly smaller size.

In the exemplary embodiment according to FIG. 3, the radial seat 22 is formed solely by one of the two parts of the roll body whereas the pin 23 is part of the other part of the roll body.

If not otherwise stated, the explanations concerning the first exemplary embodiment also apply to the examples according to FIGS. 2 and 3. In particular, these exemplary embodiments have essentially the same advantages.

I claim:

1. A roll arrangement, comprising:
   a roll ring having longitudinal first and second ends, and a longitudinal bore hole,
   a divided roll body having first and second ends, a length, a central portion between the first and second ends, and an external circumference, the roll body including first and second parts which form first and second tensioning flanges, respectively, each of which axially supports an end of the roll ring,
   a threaded connecting device situated entirely in the central portion of the roll body and interconnecting the first and second parts, the threaded connecting device transmitting forces acting between the first and second parts of the roll body,
   a hydraulic tensioning device for tensioning the roll arrangement, and
   a mechanical fixing device for fixing the amount of hydraulically produced tension maintained by the roll body, the hydraulic tensioning device and the mechanical fixing device being arranged on the external circumference of the roll body.

2. Roll arrangement according to claim 1, wherein the two parts of the roll body each form a radial seat which can be spread apart.

3. Roll arrangement according to claim 1, wherein at least one of the two parts of the roll body forms a radial seat which interacts with the bore hole of the roll ring including a clearance for assembly and which can be spread apart by means of a wedge device provided in the tensile connection under the force transmitted by the tensile connection for removing the clearance for assembly.

4. Roll arrangement according to claim 3, wherein the first and second parts of the roll body have mutually facing threaded bolts which can be interconnected by a threaded sleeve, the external circumference of which forms the radial seat for the roll ring.

5. Roll arrangement according to claim 3, wherein each radial seat supports the roll ring on the greater part of its length.

6. Roll arrangement according to claim 3, wherein the wedge device is formed by inclined flanks of a thread inside each radial seat.

7. Roll arrangement according to claim 6, wherein each radial seat has an essentially hollow-cylindrical shape and is connected by a threaded bolt as a tension rod.

* * * * *

UNITED STATES PATENT AND TRADEMARK OFFICE
CERTIFICATE OF CORRECTION

PATENT NO. : 5,109,585
DATED : May 5, 1992
INVENTOR(S) : Uwe Kark

It is certified that error appears in the above-identified patent and that said Letters Patent is hereby corrected as shown below:

Claim 3, lines 11 and 12 delete "tensile connection under the force transmitted by the tensile connection" and insert -- threaded connecting device --.

Signed and Sealed this

Fourth Day of January, 1994

Attest:

BRUCE LEHMAN

Attesting Officer

Commissioner of Patents and Trademarks